US012434485B2

(12) United States Patent
Vazquez Fernandez et al.

(10) Patent No.: US 12,434,485 B2
(45) Date of Patent: Oct. 7, 2025

(54) AIR INGESTION PREVENTION

(71) Applicant: Hewlett-Packard Development Company, L.P., Spring, TX (US)

(72) Inventors: Dorkaitz Alain Vazquez Fernandez, Sant Cugat del Valles (ES); Maria Dinares Argemi, Sant Cugat del Valles (ES); Mauricio Seras Franzoso, Sant Cugat del Valles (ES); Josep Ortiz Mompel, Sant Cugat del Valles (ES)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 179 days.

(21) Appl. No.: 18/251,142

(22) PCT Filed: Oct. 30, 2020

(86) PCT No.: PCT/US2020/058237

§ 371 (c)(1),
(2) Date: Apr. 28, 2023

(87) PCT Pub. No.: WO2022/093267

PCT Pub. Date: May 5, 2022

(65) Prior Publication Data

US 2023/0406001 A1 Dec. 21, 2023

(51) Int. Cl.

*B41J 2/19* (2006.01)
*B41J 2/165* (2006.01)
*B41J 2/175* (2006.01)

(52) U.S. Cl.

CPC ............. *B41J 2/19* (2013.01); *B41J 2/16508* (2013.01); *B41J 2/17523* (2013.01)

(58) Field of Classification Search

CPC .... B41J 2/16505; B41J 2/16508; B41J 2/175; B41J 2/17503; B41J 2/17506; B41J 2/17509; B41J 2/17513; B41J 2/17523; B41J 2/17553; B41J 2/19

See application file for complete search history.

(56) References Cited

U.S. PATENT DOCUMENTS

| | | | |
|---|---|---|---|
| 4,454,518 | A | 6/1984 | Bangs |
| 6,120,139 | A | 9/2000 | Childers et al. |
| 6,250,747 | B1 | 6/2001 | Hauck |
| 6,250,748 | B1 | 6/2001 | Sasaki et al. |
| 6,254,214 | B1 | 7/2001 | Murthy et al. |
| 6,533,404 | B1 | 3/2003 | Olsen |
| 6,644,774 | B1 | 11/2003 | Burger et al. |

(Continued)

FOREIGN PATENT DOCUMENTS

| | | | |
|---|---|---|---|
| CN | 1137978 | A | 12/1996 |
| CN | 1364693 | | 8/2002 |

(Continued)

*Primary Examiner* — Anh T Vo
(74) *Attorney, Agent, or Firm* — Jordan IP Law, LLC

(57) ABSTRACT

According to an example, a printhead storage device comprises a printhead pocket to receive a printhead, a receptacle with an interior chamber wherein printing fluid is provided, and a fluid interconnect device comprising a fluid path with the interior chamber. Upon insertion of a printhead to the pocket, the fluid interconnect device is connected to the printhead, thereby providing a fluid connection between the printhead and the interior chamber and wherein the printhead is not operable when inserted in the printhead pocket.

18 Claims, 4 Drawing Sheets

(56) References Cited

U.S. PATENT DOCUMENTS

| | | | |
|---|---|---|---|
| 8,132,889 | B2 | 3/2012 | Mcreynolds et al. |
| 8,469,501 | B2 | 6/2013 | Murray |
| 2001/0019347 | A1 | 9/2001 | Hauck |
| 2001/0024223 | A1 | 9/2001 | Thielman et al. |
| 2003/0058316 | A1 | 3/2003 | Olsen |
| 2005/0018022 | A1 | 1/2005 | Studer et al. |
| 2005/0168540 | A1 | 8/2005 | Wilson et al. |
| 2008/0036816 | A1 | 2/2008 | Nishida |
| 2011/0109693 | A1 | 5/2011 | Ohnishi |
| 2013/0050312 | A1 | 2/2013 | Murray |

FOREIGN PATENT DOCUMENTS

| | | |
|---|---|---|
| CN | 201362042 | 12/2009 |
| CN | 102066116 | 5/2011 |
| WO | 2010/105519 | 9/2010 |

AIR INGESTION PREVENTION

BACKGROUND

Printing systems comprises printheads to dispense printing fluid on a media, being the printheads supplied with printing fluid through fluid lines connected to a fluid supply. In some cases, some of the printheads may be decoupled from the fluid lines in order to switch the print mode of the printing system, replace the current printhead for another one with similar characteristics, or extract a faulty printhead.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
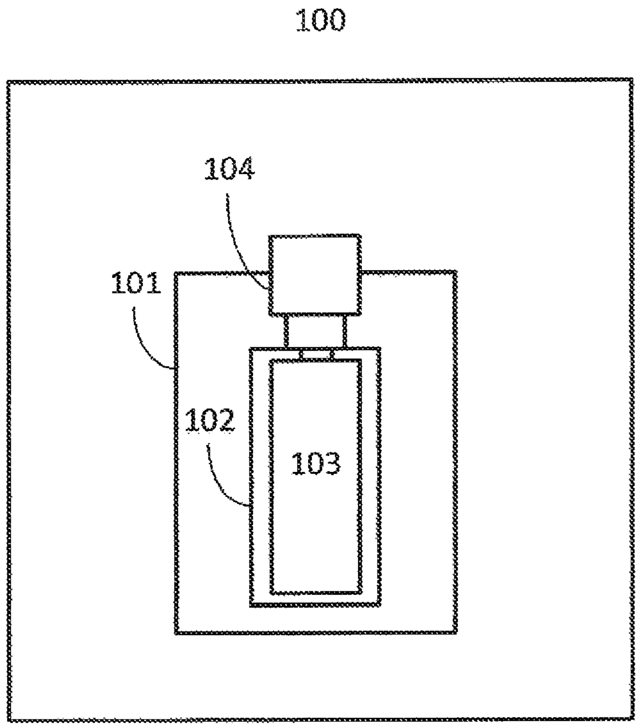
FIG. 1 shows a schematic cross-section of a printhead storage device, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Printing systems comprise printheads to dispense a printing fluid on a print media through a series of fluid dispensers. Such printing fluid flows from fluid supplies to the printheads through a series of fluid lines. In order to receive the printheads, printing systems may further printhead holders (such as printhead pockets, printhead slots, or printhead holders) in which the printheads are inserted. The insertion establishes fluid paths from the fluid supplies to the printhead such that the printhead is fluidly connected to the fluid supply.

In order to establish a connection with a fluid line, the fluid line may comprise an outlet end such as a fluid interconnect device or a fluid interface. Thus, the outlet end may be coupled to a connector of the printhead such that the printhead and the fluid supplies are fluidly connected through a fluid path. Accordingly, no fluid path from the fluid supply to the printhead is established when the printhead is decoupled from the outlet end.

During the lifespan of a printing system, printheads may be decoupled from the fluid supplies regularly. Such decoupling may be caused by the extraction of a faulty printhead, a printhead replacement for another one having different specifications, or a printing operation that is to be performed in the printing system. Hence, as a result, printheads may be fluidly coupled to and fluidly decoupled from fluid supplies on a regular basis during their lifespan.

Printheads comprise printing fluid dispensers such as nozzles that are fluidly connected to printhead fluid chambers of the printheads. Printhead fluid chambers may comprise printing fluid that flows from the fluid supplies of the printing system. When heat is selectively applied to the printing fluid (for instance by using a heat transducer, such as a resistor), such printing fluid may be expelled from the printhead fluid chamber through the nozzles. The heat may be sufficient to cause a vapor bubble to be formed in the printhead fluid chamber, and the expansion of this vapor bubble, propels a drop through the nozzle adjacent to the air bubble. Once the drop of printing fluid has been dispensed, the vapor bubble that propelled the drop of printing fluid rapidly collapses and the printhead fluid chamber is refilled with printing fluid that flows through a fluid line of the printing system. In other examples, new printheads may contain air bubbles within their printhead fluid chamber when the printhead fluid chamber is refilled from the fluid supplies. In addition to that, the solubility of air in printing fluid may decrease with temperature, and during a printing operation, air may be released due to heating of the printing fluid and may result in an accumulation of air in the form of air bubbles within the printhead fluid chamber. Also, when the printhead is decoupled from the fluid supply of the printing system, ambient air may be ingested by the printhead.

Since printheads may dispense printing fluid by selectively heating printing fluid within the printhead fluid chambers, the temperature within a printhead may vary based on a condition of the printhead. Hence, during an operative condition (for instance when using the printhead to dispense printing fluid while being fluidly connected to the fluid supply), temperatures within the printhead fluid chamber may be higher than during a non-operative condition (for instance when the printhead is not coupled to the fluid supplies through the fluid lines). A shift from an operative condition to a non-operative condition may result in a decrease in the temperature within the printhead fluid chamber of the printhead, and depending on the printing fluid, such temperature decrease may cause a volume difference that results in a pressure difference of the air bubbles. Such pressure difference may lead to an air ingestion through nozzles or a connector of the printhead. If the printhead is coupled with the fluid supply, the volume difference resulting from the air pressure difference of the air bubble may be refilled with printing fluid. However, since printing systems generally have a limited number of printhead slots in their carriages, most of the time the printheads are decoupled from the fluid supply when inoperative in order to use their slots for additional printheads. Hence, having the printhead decoupled from the fluid supply (i.e. in the non-operative condition), may lead to air ingestion of ambient air as a result of the fluid volume changes within the printhead fluid chambers of the printhead.

As a result of air ingestion, air bubbles are created within the printhead chamber. These air bubbles reduce the printing fluid within the printhead fluid chamber. Even when the printhead is recoupled to the fluid supply and shifts back its condition from non-operative to operative, the air bubble (or air bubbles) remain(s). Subsequent shifts from the operative condition to the non-operative condition may increase the air ingestion, thereby leading to a further increase in the volume of the air bubble and a further reduction in the maximum amount of printing fluid within the printhead fluid chamber that may eventually affect to the printhead performance. Depending on the volume of the air bubble, the printhead image quality may be decreased such that the printhead is considered as faulty. Thus, air ingestion derived from printing operations and repeated removal and reinstallation of the printheads reduces the lifespan of the printhead.

In the following, air ingestion prevention devices will be described in which the printheads can be stored when not in use. These may be referred to as storage devices, switching stations and printhead repositories. In some examples, printing systems may include such devices to store printheads that are not in use and are not in an operative condition.

Throughout the description, the terminology "engaged state" and "disengaged state" will be used to refer to the status of a fluid path between an air ingestion prevention device and the printhead. In the engaged state of an air ingestion prevention device, a fluid path is established from the device to the printhead and in the disengaged state of the storage device no fluid path is established from the device to the printhead.

According to an example, a printhead storage device comprises a printhead pocket to receive a printhead, a receptacle with an interior chamber, and a fluid interconnect device comprising a fluid path with the interior chamber. The interior chamber of the receptacle may be provided with printing fluid. Upon insertion of a printhead to the printhead pocket, the printhead is not operable but the fluid interconnect device is connected to the printhead, thereby providing a fluid connection between the printhead and the interior chamber. In other words, the printhead remains in the non-operative condition even though is connected to a fluid supply. By engaging the printhead storage device to the non-operative printhead, the printhead is fluidly connected to the receptacle, and therefore, the printhead will ingest printing fluid instead of ambient air once the contraction of the air bubbles within a printhead fluid chamber of the printhead has occurred.

In other examples, the printhead storage device further comprises a cap to contact nozzles associated with the printhead, wherein the cap is biased towards the printhead by a biasing element. In an example, the cap comprises an aperture that defines a labyrinthic conduit between the nozzles of the printhead and ambient air.

Referring now to FIG. 1, a printhead storage device 100 is shown. The printhead storage device 100 comprises a printhead pocket 101 to receive a printhead (not shown in FIG. 1), a receptacle 102 having an interior chamber 103, and a fluid interconnect device 104 fluidly connected to the interior chamber 103 through an opening of the receptacle 102. The receptacle 102 may comprise printing fluid within the interior chamber 103 and the interior chamber may be printing fluid-resistant in order to prevent printing fluid leaks from the receptacle 102. While no printhead is coupled to the printhead pocket 101, the printing fluid cannot flow from the interior chamber to the outside, i.e. there is no fluid path. However, when a non-operative printhead is coupled to the printhead pocket 101, a fluid path between the interior chamber 103 and the printhead is established. Therefore, upon insertion of the printhead in the printhead pocket 101, the fluid path between the interior chamber 103 and the printhead is established, but the printhead is not operable for instance because the insertion of the printhead in the printhead pocket does not result in a data connection, or electrical connection, between the storage device and the printhead.

In order to establish and disestablish the fluid path, the fluid interconnect device 104 may comprise a blocking element that allows fluid to pass through the fluid interconnect device 104 while the printhead is inserted in the printhead pocket 101. In an example, the blocking element of the fluid interconnect device 104 is unblocked upon a connection of a connector of the printhead to the fluid interconnect device 104. In other examples, the fluid interconnect device 104 comprises a check valve so that a direction of the printing fluid from the interior chamber 103 to the printhead is allowed but a reverse direction from the printhead to the interior chamber 103 is not allowed for the printing fluid.

In some examples, the receptacle 102 further comprises an inlet that allows printing fluid to flow to the interior chamber 103. If the receptacle 102 runs out of printing fluid, printing fluid may be provided through the inlet. In further examples, the receptacle 102 may be coupled to an external device that provides an amount of printing fluid periodically. In additional examples, the external device provides printing fluid upon a sensor of the printhead storage device 100 determines that the receptacle 102 is running out of printing fluid.

In some other examples, the receptacle 102 of the printhead storage device 100 is an expandable and collapsible bag. In some examples, the interior chamber 103 of the bag is substantially air free.

As used throughout the description, "air free" means that the surface of the printing fluid is not exposed to air but that the printing fluid itself may contain air bubbles.

Figure 2:
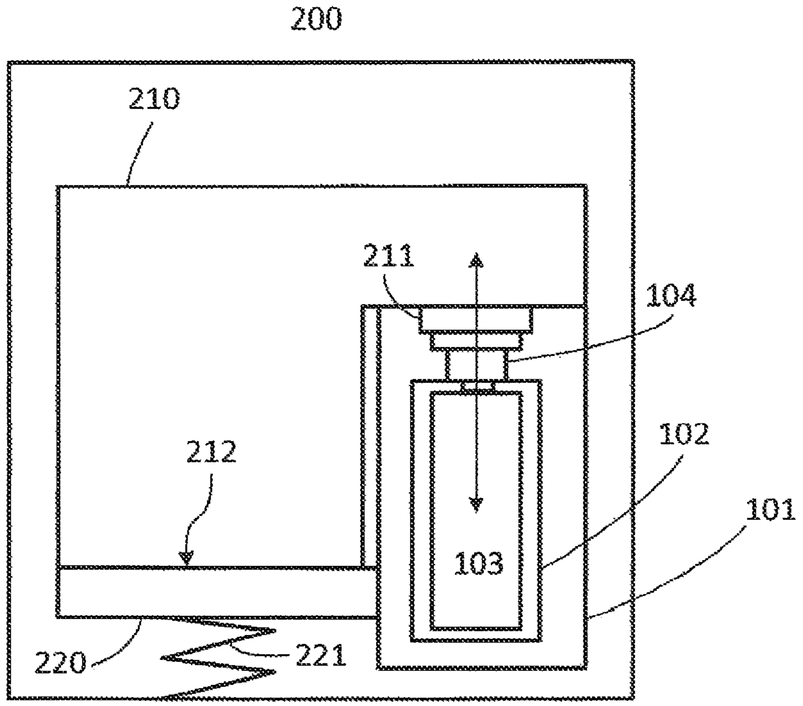
FIG. 2 shows a schematic cross-section of a printhead storage device comprising a cap to contact nozzles associated to a printhead, according to an example of the present disclosure.

As used herein, "printing fluid" refers generally to any substance that can be applied upon a substrate by a printer during a printing operation, including but not limited to inks, primers and overcoat materials (such as a varnish), water, and solvents other than water Referring now to FIG. 2, a printhead storage device 200 having a cap 220 is shown. The printhead storage device 200 comprises a printhead pocket 101, a receptacle 102 having an interior chamber 103, a fluid interconnect device 104, and the cap 220. As previously described in reference to FIG. 1, within the volume of the interior chamber 103 there is printing fluid. A printhead 210 is received by the printhead pocket 101 such that, when a connector 211 is coupled to the fluid interconnect device 104, the printhead 210 is fluidly connected to the interior chamber 103. However, the insertion that leads to the fluid connection does not result in a data connection, or any electrical connection, between the storage device 200 and the printhead 210, i.e. the printhead is not operable when inserted in the printhead pocket 101. The printhead 210 comprises a printhead fluid chamber (not shown in FIG. 2) in which the printing fluid is stored before ejecting drops through a series of nozzles 212. The cap 220 contacts the nozzles 212 while the printhead 210 is connected to fluid interconnect device 104. In order to ensure that the cap 220 contacts the series of nozzles 212 of the printhead 210, the cap 220 is biased towards the series of nozzles 212 by a biasing element 221. In other examples, the cap 220 comprises an aperture that defines a labyrinthic conduit between the nozzles and ambient air.

Biasing elements can include, amongst others, springs, spring plates, gas canisters, or any element capable of recovering size and shape after a deformation, for example, a deformation caused by the process transmitted forces.

In an example, a fluid connection (indicated with a double arrow in FIG. 2) from the interior chamber 103 to the printhead 210 is provided during a connection of the connector 211 with the fluid interconnect device 104. If the printhead fluid chamber (not shown in FIG. 2) includes air bubbles and the printhead has shifted from an operative condition to a non-operative condition, the volume difference within the printing fluid chamber of the printhead 210 results in a pressure difference that leads to air ingestion. However, this volume difference may be compensated with printing fluid from the interior chamber 103 of the receptacle 102. Therefore, an engagement of the printhead storage device 200 with a printhead 210 may prevent the air ingestion within the printhead fluid chamber of the printhead 210 once the printhead condition has changed from operative to non-operative. When the printhead 210 is to change its condition from non-operative to operative, disengagement of the printhead storage device 200 may disconnect the fluid connection so that the printhead 210 can be coupled back to the fluid lines that are connected to the fluid supply. As a result of the usage of the printhead storage device 200, printhead air ingestion may be reduced and the lifespan of the printhead 210 may be increased as compared with a printhead that is not stored in a printhead storage device 200 when not in use.

Figure 3:
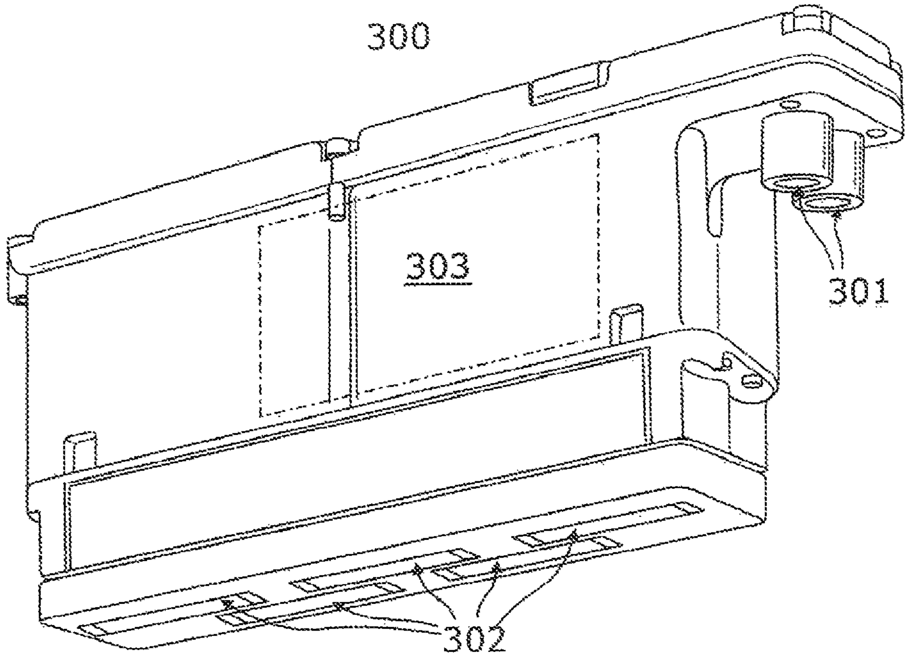
FIG. 3 shows a printhead comprising a printhead fluid chamber, according to an example of the present disclosure.

Referring now to FIG. 3, a printhead 300 is shown. The printhead 300 comprises a connector 301, a series of nozzles 302, and a printhead fluid chamber 303 (represented by dashed lines). As described above, the printhead 300 may dispense printing fluid by selectively heating printing fluid within the printhead fluid chamber 303 with a resistor. The resistor may generate sufficient heat to form a vapor bubble in the printhead fluid chamber 303 that propels a drop through one of the nozzles of the series of nozzles 302 that is adjacent to the air bubble created within the printhead fluid chamber 303.

As previously described, during the operative condition of the printhead 300, the temperature within the printhead fluid chamber 303 is higher than during the non-operative condition of the printhead 300. If air bubbles are present within the printhead fluid chamber 303, the volume of these air bubbles may vary because of a condition-shift. When the connector 301 of the printhead 300 is coupled to the fluid lines of the printing system, the volume differences may be compensated with printing fluid from the fluid supply. However, most of the time the printhead 300 is not fluidly connected to the fluid supply, and the printhead 300 ingests air that is retained within the printhead fluid chamber 303. In order to prevent air ingestion, which has a negative impact on printhead performance (for instance a decrease in the resulting printed image quality), the printhead 300 may be engaged with an air ingestion prevention device such as the printhead storage device previously explained in reference with FIGS. 1 and 2.

According to some examples, a switching station may be used to prevent air ingestion. The switching station may comprise a printhead slot to receive a printhead in a non-operative position, a printing fluid container comprising printing fluid, and a printing fluid interface to fluidly connect the printhead and the printing fluid container. When a printhead is inserted in the printhead slot, a fluid path from the container to the printhead is established upon insertion. As previously described in the description, the switching station comprises an engaged state in which the printhead is fluidly connected to the container of the switching station, and a disengaged state in which no fluid path from the container to the printhead is established.

In some examples, the switching station comprises a cap to contact a series of nozzles of the printhead, being the cap biased towards the nozzles by a biasing element.

In some other examples, the container comprises an inlet, wherein a fluid delivery system is to flow printing fluid to the container through the inlet. In other examples, the fluid delivery system may flow printing fluid to the container once a sensor of the switching station has determined that the printing fluid is at a minimum threshold printing fluid level.

According to some examples, a switching station may comprise a second printing fluid interface to fluidly connect a second printhead and the printing fluid container. Therefore, the container of the switching station may be fluidly connected to second printing fluid interface such that, when having multiple printheads inserted, two fluid paths are enabled by the switching station, one for each printhead. Upon at least one of the printheads is connected to the printhead storage device a first fluid path and/or a second fluid path is established from the container to the printhead (or printheads) that are connected to its respective printing fluid interface. In other examples, the container comprises an internal barrier that divides an interior volume of the interior chamber into a first volume and a second volume, wherein the first fluid path is established from the first volume to the printhead connected to the first printing fluid interface and the second fluid path is established from the second volume to the printhead connected to the second printing fluid interface.

Figure 4:
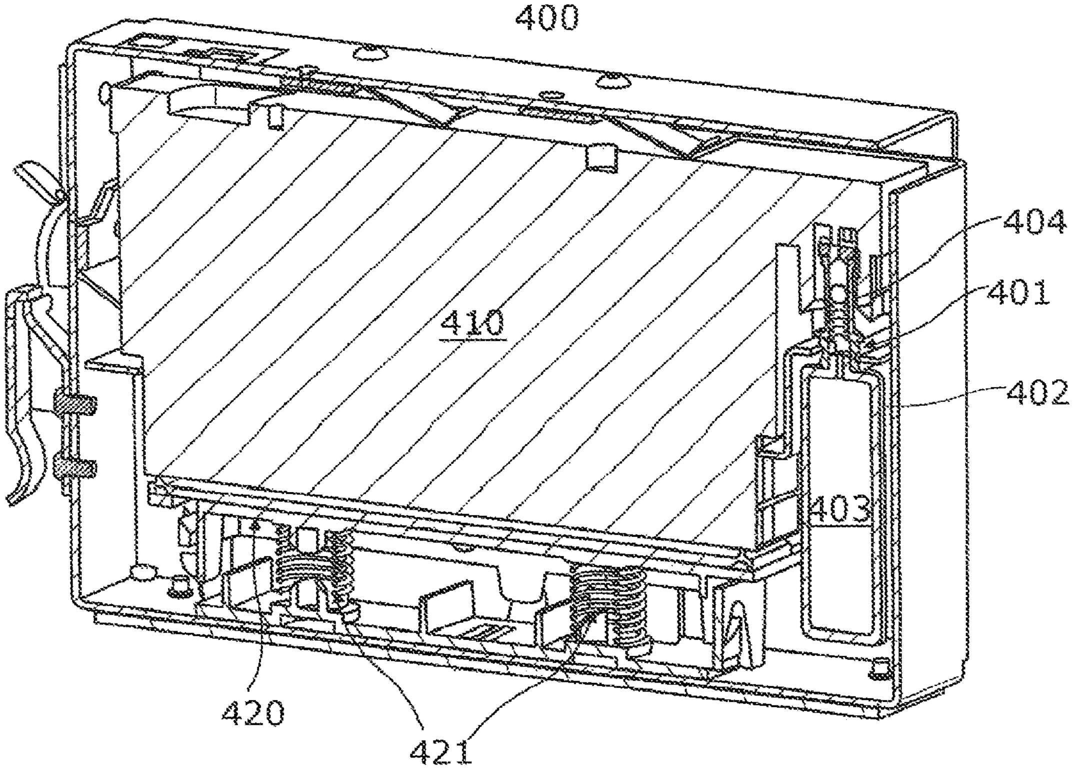
FIG. 4 shows a cross-sectional view of a printhead repository, according to an example of the present disclosure.

Referring now to FIG. 4, a cross-sectional view of a storage device or a printhead repository 400 to store non-operative printheads is shown. The printhead repository 400 may be a standalone device or may be integrated within a printing system. The printhead repository 400 comprises a printhead holder 401, a receptacle 402 having an interior volume 403 comprising printing fluid, a first fluid interface 404 to receive a connector of a printhead, and a cap 420. In other examples, the printhead repository 400 need not comprise the cap 420. In FIG. 4, the printhead repository 400 is in an engaged state in which the printhead holder 401 receives a printhead 410 by a connection of the first printing fluid interface 404 to a connector (not shown in FIG. 4). The printhead comprises a series of nozzles (not shown in FIG. 4), being the series of nozzles contacted by the cap 420 that is biased towards the nozzles by biasing elements 421. The usage of cap 420 prevents the abrasion and erosion of the nozzles of the printhead 410. In an example, the usage of the cap 420 prevents the clogging of the nozzles of the printhead 410.

As previously described, the printhead repository 400 comprises an engaged state and a disengaged state. During the engaged state, a fluid path from the interior volume 403 of the receptacle 402 to a printhead fluid chamber (not shown in FIG. 4) of the printhead 410 is established. During the disengaged state, no fluid path from the interior volume 403 to the printhead fluid chamber of the printhead 410 is established. In the example of FIG. 4, the connector of the printhead is coupled with the printing fluid interface such that a first fluid path from the receptacle 402 to the printhead 410 is enabled, and hence, the printhead repository 400 is in the engaged state. In some examples, the first printing fluid interface 404 may comprise a blocking element such that printing fluid cannot flow outside in case of not having a printhead connected.

In some examples, the first printing fluid interface 404 comprises a check valve and, upon insertion of the printhead 410 in the printhead holder 401, the check valve allows printing fluid to flow from interior volume 403 of the container 402 to the printhead 410. In other examples, the container 402 is an expandable and collapsible bag and the interior chamber defined by the interior volume 403 is substantially air free.

In some other examples, the container 402 may further comprise an inlet and the printing fluid flows into the container 402 through the inlet. In further examples, the container 402 is fluidly connected to a second printing fluid interface and the interior volume 403 comprises a barrier that separates the interior volume 403 into a first volume and a second volume. Having available a second printing fluid interface may provide a second connection for an additional printhead, and therefore, two printheads can be fluidly connected to the receptacle 403 at the same time. In other examples, each of the first volume and the second volume comprise a different type of printing fluid.

According to an example, an air ingestion prevention device may be used within a printing system in order to engage with at least one of printheads that is decoupled from the fluid lines of the printing system.

Figure 5:
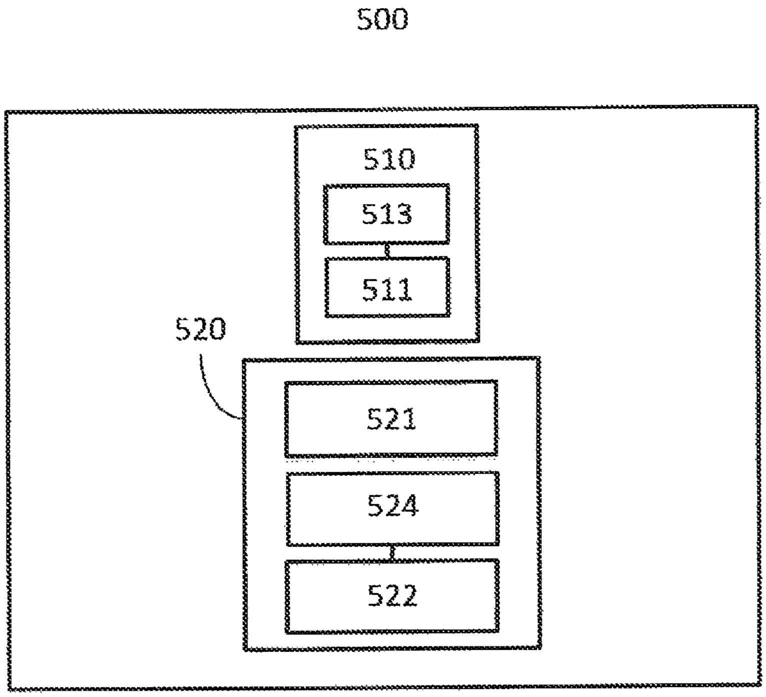
FIG. 5 shows a printing system comprising a switching station, according to an example of the present disclosure.

Referring now to FIG. 5, a printing system 500 is shown. The printing system 500 comprises a printhead 510 and a storage device or a switching station 520, wherein the switching station 520 has an engaged state and a disengaged state. The printhead 510, which is in a non-operative condition, comprises a connector 511 that is fluidly connected to a printhead fluid chamber 513, as previously described in reference with FIG. 3. The switching station 520 comprises a printing fluid container 522 that is fluidly connected to a printing fluid interface 524. The printing fluid interface 524 is to couple with the connector 511 of the printhead 510 while the printhead 510 is inserted to the printhead slot 521 of the printing system 500.

As previously explained, the receptacle 522 has an interior volume wherein printing fluid is provided. The receptacle 522 further comprises a first opening that is fluidly connecting the interior volume with the printing fluid interface 524. In case of an insertion of the printhead 510 in the printhead slot 521, such insertion causes the switching station 520 to enter into the engaged state and a fluid path between the printhead fluid chamber 513 and the interior volume of the container 522 is established. Thus, during the engaged state of the switching station 520 the printhead 510 is fluidly connected to the container 522 and the fluid path from the container 522 to the printhead fluid chamber 513 of the printhead 510 is established. In the same way, an extraction of the printhead 510 from the printhead slot 521 causes the switching station 520 to enter into the disengaged state, wherein during the disengaged state, the printing fluid interface 524 and the printhead 510 are decoupled so that there is no fluid path between the printhead fluid chamber 513 and the interior volume of the container 522.

In some examples, the switching station 520 may comprise further printing fluid interfaces to fluidly connect further printheads to the container 522. In other examples, the switching station 520 of the printing system 500 may be replaced by a storage device or a printhead repository. In an example, the printing system 500 comprises a printhead storage device 100 or a printhead storage device 200 instead of the switching station 520. In other examples, the printing system 500 comprises a printhead repository to store non-operative printhead instead of the switching station 520.

Figure 6:
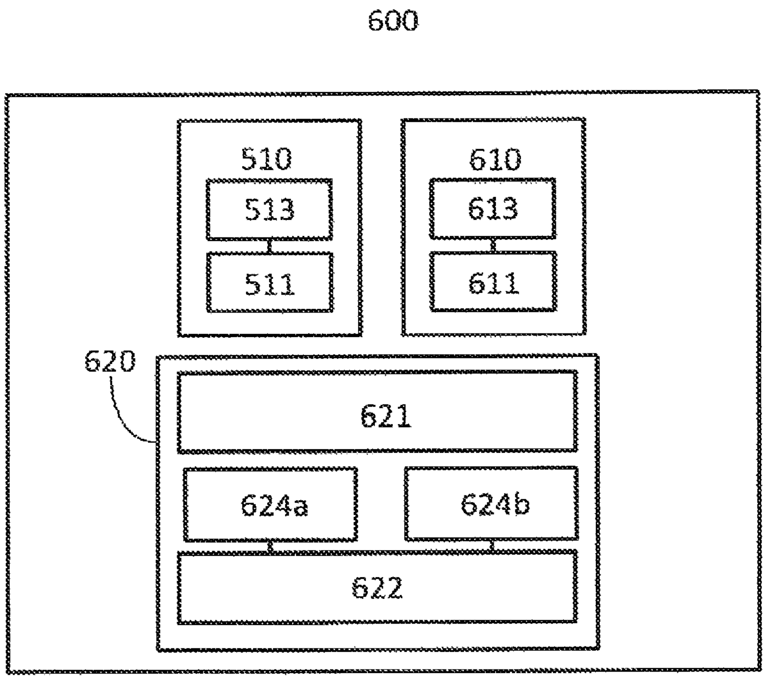
FIG. 6 shows a printing system comprising a printhead repository, according to an example of the present disclosure.

Referring now to FIG. 6, a printing system 600 is shown. The printing system 600 comprises a first printhead 510, a second printhead 610, and a storage device or a printhead repository 620. In this example, the printhead repository 620 comprises a printhead holder 621 to receive non-operative printheads, a receptacle 622 comprising printing fluid, a first printing fluid interface **624*a*, and a second printing fluid interface 624*b*. The first printing fluid interface 624*a* is to receive a first connector 511 of the first printhead 510 and the second printing fluid interface 624*b* is to receive a second connector 611 of the second printhead 610. As previously explained, the printing fluid interfaces are fluidly connected to the receptacle 622**.

As previously described in the description, when the printhead holder 621 receives the first printhead 510 and/or the second printhead 610, a respective connector of the printhead is coupled with its respective printing fluid interface such that a fluid path from the receptacle 622 to the respective printhead is enabled. Hence, when connecting the first printhead 510 and the second printhead 610, the first connector 511 is coupled with the first printing fluid interface **624*a* and the second connector 611 is coupled with the second printing fluid interface 624*b* such that a first fluid path from the receptacle 622 to a first printhead fluid chamber 513 of the first printhead 510 is enabled and a second fluid path from the receptacle 622 to a second printhead fluid chamber 613 of the second printhead 610** is enabled.

In some examples, the printing system 600 further comprises a fluid delivery system, wherein the fluid delivery system is to flow printing fluid to the receptacle 622 through an inlet of the receptacle 622. In some other examples, the interior volume of the receptacle 622 comprises a barrier that divides the interior volume into a first volume and a second volume, wherein during the engaged state of the printhead repository 620, the first fluid path is established from the first volume to the first printhead fluid chamber 613 and the second fluid path is established from the second volume to the second printhead fluid chamber 613.

Figure 7:
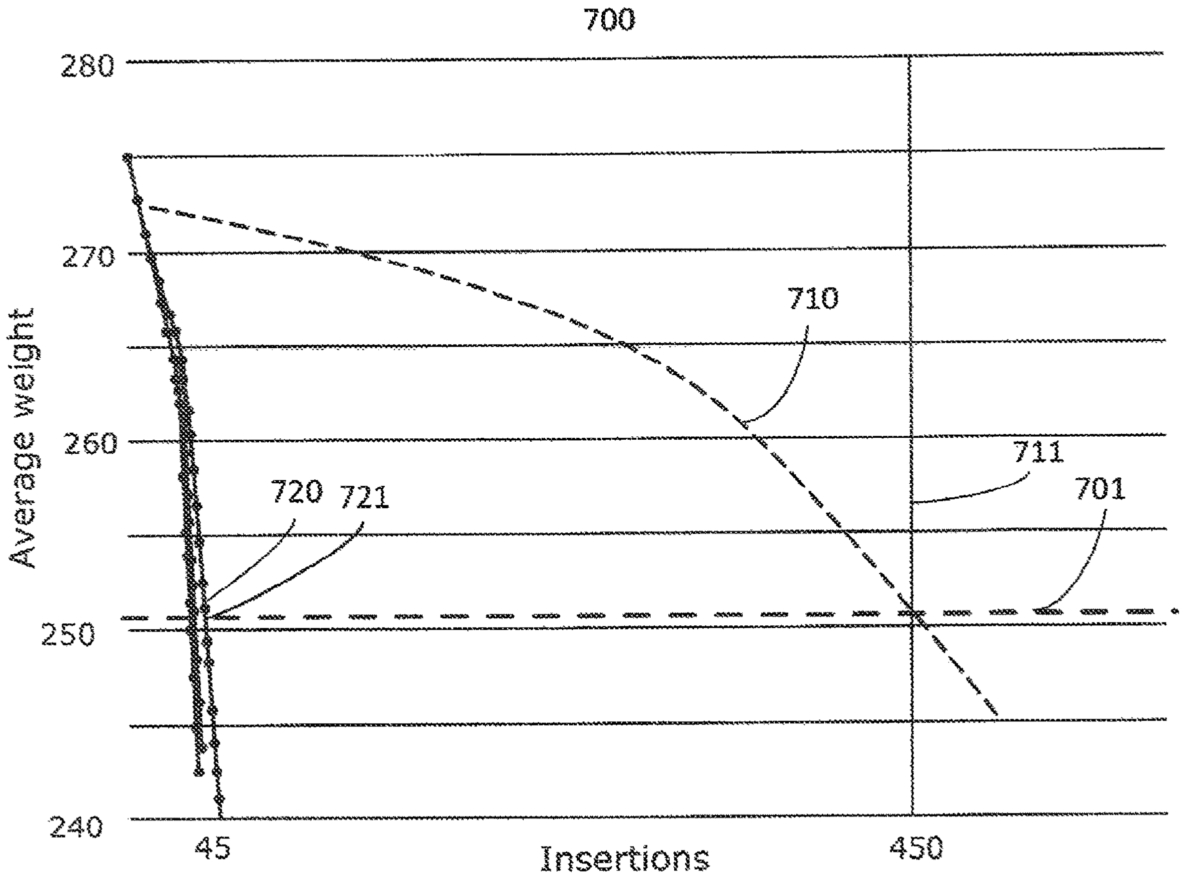
FIG. 7 shows a line chart representing average weight of printheads over a number of insertions, according to an example of the present disclosure.

Referring now to FIG. 7, a line chart 700 representing the average weight of printheads over a number of insertions is shown. The Y-axis represents the average weight of a printhead in grams and the X-axis represents the number of insertions. Each of the curves depicts data of a printhead, wherein each of the printheads have performed the same printing operations with the same printing fluid while being subjected to the same environmental conditions in a printing system. A weight failure value 701 is indicated as a horizontal line, wherein the weight failure value 701 represents a minimum weight for the printhead in order to perform printing operations without having image quality performance defects. Depending on the type of printhead, the weight failure value 701 may be different. A first printhead data 710 represents a first printhead that has been engaged with an air ingestion prevention device upon being decoupled from the fluid lines and a second printhead data 720 represent a second printhead that has not been engaged with an air ingestion prevention device upon being decoupled from the fluid lines.

As depicted in the line chart 700, the first printhead data 710 and the second printhead data 720 behave similarly during low amounts of insertions. However, while the first printhead data 710 has a decrease in its weight that causes the first printhead data to intersect the weight failure value 701 at a first point 711 (i.e. at 450 insertions), the second printhead data 720 suffers a greater decrease in its weight at an earlier number of insertions. As a result, the second printhead data 720 intersects the weight failure value 701 at a second point 721 (i.e. at 45 insertions). In case of comparing the number of insertions between the printheads, the second printhead reaches the weight failure value 710 in 10 times fewer insertions than the first printhead.

At the left side of the line chart 700, additional printhead data is represented. However, since none of the printheads to which that data is associated was connected to an air ingestion prevention device, the printheads behave similarly to the second printhead data 720, thereby intersecting the weight failure value 701 at around 45 insertions.

In some examples, the printheads may have a different weight. In the same way, the number of insertions may vary for other types of printheads based on a series of printhead characteristics such as the number of nozzles, the shape of the printhead fluid chamber, or the type of printing fluid. However, it should be understood that the line chart 700 represents a comparison between printheads that have not been connected to the air ingestion prevention device and a printhead that has been connected to the air ingestion prevention device.

According to some examples, a method to store a printhead in an ingestion prevention device may be performed in order to prevent air ingestion. The storage device may be, for instance, one of the storage devices, switching stations and printhead repositories previously described in the description.

Figure 8:
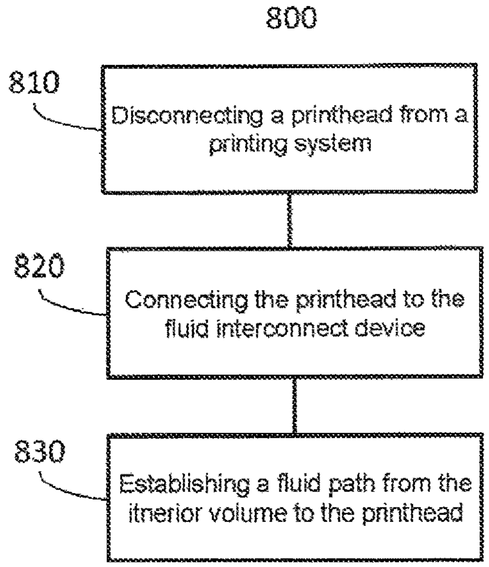
FIG. 8 shows a method to establish a fluid path to a printhead, according to an example of the present disclosure.

Referring now to FIG. 8, a method 800 to store a printhead is shown. The method 800 comprises a block 810, a block 820, and a block 830 and may be used with an air ingestion device as previously described in reference with FIGS. 1-2 and 4-6. At block 810, method 800 comprises disconnecting the printhead from a printing system. The printhead may be, for instance, the printhead previously described in reference with FIG. 3, and the disconnection of the printhead may be performed, for instance, by decoupling the printhead form the fluid supply of the printing system. At block 820, the method 800 comprises connecting the printhead to the fluid interconnect device, wherein after the connection of the printhead, the printhead remains non-operative. In some examples, the printhead may be connected to the fluid interconnect device immediately after being disconnected from the printing system. In other examples, the printhead may be connected upon a time, for instance 5 minutes. At block 830, method 800 comprises establishing a fluid path from the interior volume of the receptacle to the printhead. The establishment of the fluid path enables a printhead to ingest printing fluid instead of air, as explained above. By preventing the air ingestion, the lifespan of the printhead is extended, as represented in the line chart 700 of FIG. 7.

In some examples, method 800 further comprises flowing printing fluid to the interior volume of the receptacle through an inlet of the receptacle. In an example, a fluid delivery system flows the printing fluid. In other examples in which the air ingestion prevention device acts as a standalone device, the printing fluid may be supplied by an external device. In some other examples in which the air ingestion prevention device comprises a cap, method 800 further comprises capping a series of nozzles of the printhead, as previously described in the description.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A printhead storage device comprising:

a printhead pocket to receive a printhead;

a receptacle with an interior chamber wherein printing fluid is provided; and a fluid interconnect device comprising a fluid path with the interior chamber, wherein the printhead pocket, the receptacle, and the fluid interconnect device are independent of a printer, wherein upon insertion of a printhead in the printhead pocket:

the fluid interconnect device is connected to the printhead, thereby providing a fluid connection between the printhead and the interior chamber; and the printhead is not operable when inserted in the printhead pocket, and wherein an extraction of the printhead from the printhead pocket moves a blocking element of the fluid interconnect device to a position that blocks the fluid path.

2. The storage device of claim 1 comprising a cap to contact nozzles of an inserted printhead, wherein the cap is biased towards the printhead by a biasing element.

3. The storage device of claim 2, wherein the cap comprises an aperture that defines a labyrinthic conduit between the nozzles and ambient air.

4. The storage device of claim 1, wherein the fluid interconnect device comprises a check valve, wherein upon insertion of a printhead, the check valve allows a printing fluid to flow from the receptacle to the printhead.

5. The storage device of claim 1, wherein:

the receptacle is an expandable and collapsible bag; and the interior chamber is substantially air free.

6. The storage device of claim 1, wherein the insertion of a printhead in the printhead pocket does not result in a data connection between the storage device and the printhead.

7. The storage device of claim 1, wherein the printhead pocket, the receptacle, and the fluid interconnect device are not connected to the printer.

8. A switching station comprising:

a printhead slot to receive a printhead in a non-operative condition;

a printing fluid container comprising printing fluid; and a printing fluid interface to fluidly connect the printhead and the container, wherein the printhead pocket, the receptacle, and the fluid interconnect device are independent of a printer, and wherein upon a printhead is inserted in the printhead slot, a fluid path from the container to the printhead is established, and wherein an extraction of the printhead from the printhead slot moves a blocking element of the printing fluid interface to a position that blocks the fluid path.

9. The switching station of claim 8 comprising a cap to contact a series of nozzles of the printhead, wherein the cap is biased towards the nozzles by a biasing element.

10. The switching station of claim 8, wherein the container comprises an inlet, wherein a fluid delivery system is to flow printing fluid to the container through the inlet.

11. A printing system comprising:

a printhead in a non-operative condition; and a switching station comprising:

a printhead slot to receive a printhead in a non-operative condition;

a printing fluid container comprising printing fluid; and a printing fluid interface to fluidly connect the printhead and the container, wherein the printhead pocket, the receptacle, and the fluid interconnect device are independent of a printer, and wherein upon a printhead is inserted in the printhead slot, a fluid path from the container to the printhead is established, wherein the switching station has an engaged state and a disengaged state, wherein an insertion of the printhead in the printhead slot causes the switching station to enter into the engaged state, wherein during the engaged state the printhead is fluidly connected to the container and the fluid path from the container to the printhead is established, and wherein an extraction of the printhead from the printhead slot moves a blocking element of the printing fluid interface to a position that blocks the fluid path.

12. The printing system of claim 11, wherein during the disengaged state of the switching station, no fluid path from the container to the printhead is established.

13. The printing system of claim 11, wherein the printhead pocket, the receptacle, and the fluid interconnect device are not connected to the printer.

14. The switching station of claim 8, wherein the printhead pocket, the receptacle, and the fluid interconnect device are not connected to the printer.

15. A printhead repository to store non-operative printheads, the repository comprising:

a printhead holder to receive a first non-operative printhead;

a receptacle comprising printing fluid; and a first printing fluid interface to receive a connector of the first printhead, wherein the first printing fluid interface is fluidly connected to the receptacle, wherein the printhead pocket, the receptacle, and the fluid interconnect device are independent of a printer, and wherein when the printhead holder receives the first printhead, the connector of the first printhead is coupled with the printing fluid interface such that a first fluid path from the receptacle to the first printhead is enabled, and wherein an extraction of the first printhead from the printhead holder moves a blocking element of the first printing fluid interface to a position that blocks the first fluid path.

16. The printhead repository of claim 15 further comprising a second printing fluid interface to receive a second connector of a second non-operative printhead, wherein:

the second printing fluid interface is fluidly connected to the receptacle, and, when the printhead holder receives the second non-operative printhead, the second connector of the second printhead is coupled with the printing fluid interface such that a second fluid path from the receptacle to the second printhead is enabled.

17. The printhead repository of claim 15, wherein the printhead pocket, the receptacle, and the fluid interconnect device are not connected to the printer.

18. A printhead repository to store non-operative printheads, the repository comprising:

a printhead holder to receive a first non-operative printhead;

a receptacle comprising printing fluid; and a first printing fluid interface to receive a connector of the first printhead, wherein the first printing fluid interface is fluidly connected to the receptacle, wherein the printhead pocket, the receptacle, and the fluid interconnect device are independent of a printer, wherein when the printhead holder receives the first printhead, the connector of the first printhead is coupled with the printing fluid interface such that a first fluid path from the receptacle to the first printhead is enabled, the printhead repository further comprising:

a second printing fluid interface to receive a second connector of a second non-operative printhead, wherein:

the second printing fluid interface is fluidly connected to the receptacle, and, when the printhead holder receives the second non-operative printhead, the second connector of the second printhead is coupled with the printing fluid interface such that a second fluid path from the receptacle to the second printhead is enabled, and wherein the receptacle comprises a barrier that divides an interior volume of the receptacle into a first volume and a second volume, wherein the first fluid path is from the first volume to the first printhead and the second fluid path is from the second volume to the second printhead.

* * * * *